United States Patent
Koike et al.

(10) Patent No.: US 11,431,866 B2
(45) Date of Patent: Aug. 30, 2022

(54) IMAGE PROCESSING APPARATUS FOR SCANNING A DOCUMENT BASED ON SETTINGS, METHOD FOR CONTROLLING THE SAME, AND STORAGE MEDIUM

(71) Applicant: CANON KABUSHIKI KAISHA, Tokyo (JP)

(72) Inventors: Hiroaki Koike, Kokubunji (JP); Takeshi Kogure, Toride (JP); Atsushi Ikeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/015,706

(22) Filed: Sep. 9, 2020

(65) Prior Publication Data
US 2021/0084180 A1  Mar. 18, 2021

(30) Foreign Application Priority Data

Sep. 13, 2019 (JP) .............................. JP2019-166875

(51) Int. Cl.
*H04N 1/00* (2006.01)

(52) U.S. Cl.
CPC ..... *H04N 1/00708* (2013.01); *H04N 1/00737* (2013.01); *H04N 1/00782* (2013.01); *H04N 1/00806* (2013.01)

(58) Field of Classification Search
CPC ........... H04N 1/00708; H04N 1/00737; H04N 1/00782; H04N 1/00806
USPC ................................ 358/1.15, 474, 448, 449
See application file for complete search history.

(56) References Cited

U.S. PATENT DOCUMENTS

| 2008/0285065 A1* | 11/2008 | Baba | H04N 1/3935 |
| | | | 358/1.13 |
| 2011/0102868 A1* | 5/2011 | Ishido | H04N 1/2032 |
| | | | 358/505 |
| 2012/0049434 A1* | 3/2012 | Nonaka | B65H 7/20 |
| | | | 271/3.16 |
| 2018/0063347 A1* | 3/2018 | Conlon | H04N 1/00724 |
| 2018/0332183 A1* | 11/2018 | Seki | H04N 1/00835 |

FOREIGN PATENT DOCUMENTS

| JP | 2012-222764 A | 11/2012 |
| JP | 2019-121868 A | 7/2019 |

* cited by examiner

*Primary Examiner* — Gabriel I Garcia

(74) *Attorney, Agent, or Firm* — Canon U.S.A., Inc. IP Division

(57) ABSTRACT

An image processing apparatus according to an embodiment by the present disclosure includes a storage unit for storing a reading size, an identifying unit for identifying the reading size using a sensor, a reading unit for reading an image of a document, and a setting unit for setting the identifying unit to identify the reading size. In case of the identifying unit identifying the size of the document in a state where the setting unit sets the identifying unit to identify the reading size, the reading unit reads the image of the document based on the size identified by the identifying unit. In case of the identifying unit not identifying the size of the document in the state where the setting unit sets the identifying unit to identify the reading size, the reading unit reads the image of the document based on the size stored in the storage unit.

10 Claims, 8 Drawing Sheets

FIG.7

REGISTRATION OF NEW BUTTON    703~[ OK ]   [ CANCEL ]~704

DETAILED INFORMATION REGARDING BUTTON

BUTTON NAME: [ SORTING SCAN ] (UP TO 20 CHARACTERS)

☐ DISPLAY CONFIRMATION SCREEN BEFORE EXECUTION

SCAN SETTINGS

READING SIZE: [ AUTOMATIC ▽ ]~705

COLOR MODE: [ COLOR ▽ ]

DENSITY: [ 0 ▽ ]

TWO-SIDED DOCUMENT: [ OFF ▽ ]

READING SIZE FOR IRREGULAR SIZE: [ A4 ▽ ]~706

* THIS IS SET IF ACQUISITION OF SIZE BY AUTOMATIC SIZE DETECTION IS FAILED.

~701

---

REGISTRATION OF NEW BUTTON    [ OK ]   [ CANCEL ]

DETAILED INFORMATION REGARDING BUTTON

BUTTON NAME: [ SORTING SCAN ] (UP TO 20 CHARACTERS)

☐ DISPLAY CONFIRMATION SCREEN BEFORE EXECUTION

SCAN SETTINGS

READING SIZE: [ AUTOMATIC ▽ ]~705

COLOR MODE: [ COLOR ▽ ]

DENSITY: [ 0 ▽ ]

TWO-SIDED DOCUMENT: [ OFF ▽ ]

READING SIZE FOR IRREGULAR SIZE: [ A4 ▽ ]~706

* THIS IS SET IF ACQUISITION OF SIZE BY AUTOMATIC SIZE DETECTION IS FAILED.

~702

IMAGE PROCESSING APPARATUS FOR SCANNING A DOCUMENT BASED ON SETTINGS, METHOD FOR CONTROLLING THE SAME, AND STORAGE MEDIUM

BACKGROUND

Field

The present disclosure relates to an image processing apparatus, a method for controlling the same, and a storage medium.

Description of the Related Art

The following image processing apparatus is discussed. An image processing apparatus detects the size of a document using a sensor provided in a reading unit and determines a reading size. When the image processing apparatus fails to detect the size of the document, the image processing apparatus displays a screen for receiving the selection of a reading size from a user (Japanese Patent Application Laid-Open No. 2012-222764).

Further, the following image processing apparatus is discussed. A button on an operation screen of an image processing apparatus is registered in advance in association with reading settings, and a user selects the registered button, whereby the image processing apparatus executes a reading process without requiring another operation, such as reading settings (Japanese Patent Application Laid-Open No. 2019-121868).

In an image processing apparatus in which reading settings are registered in advance in association with a button as described above, if the image processing apparatus fails to detect the size of a document after receiving the selection of the button by a user, and then displays a screen for receiving the selection of a reading size from the user, the following issue arises.

The advance registration of the reading settings in association with the button enables the execution of a reading process by a single user operation. However, if the image processing apparatus fails to detect the size of the document, the user selects the reading size, and thus convenience is impaired.

SUMMARY

In view of the above issue, the present disclosure is directed to, in an image processing apparatus in which reading settings are registered in advance in association with a button, minimizing operations of a user regarding the execution of a reading process.

According to embodiments of the present disclosure, an image processing apparatus includes a storage unit configured to store a reading size selected by a user, a sensor, an identifying unit configured to identify the reading size using the sensor, a reading unit configured to read an image of a document, a reception unit configured to receive an execution instruction to execute a reading process in which the reading unit reads the image of the document, and a setting unit configured to set the identifying unit to identify the reading size. In a case where the reception unit receives the execution instruction from the user and the identifying unit identifies the size of the document in a state where the setting unit sets the identifying unit to identify the reading size, the reading unit reads the image of the document based on the size identified by the identifying unit. In a case where the reception unit receives the execution instruction from the user and the identifying unit does not identify the size of the document in the state where the setting unit sets the identifying unit to identify the reading size, the reading unit reads the image of the document based on the size stored in the storage unit.

Further features of the present disclosure will become apparent from the following description of exemplary embodiments with reference to the attached drawings.

BRIEF DESCRIPTION OF THE DRAWINGS

FIG. 7 is a diagram illustrating an example of a setting screen.

DESCRIPTION OF THE EMBODIMENTS

Exemplary embodiments of the present disclosure will be described in detail below with reference to the drawings. The following exemplary embodiments do not limit the present disclosure, and not all the combinations of the features described in the exemplary embodiments are deemed to be essential.

Figure 1:
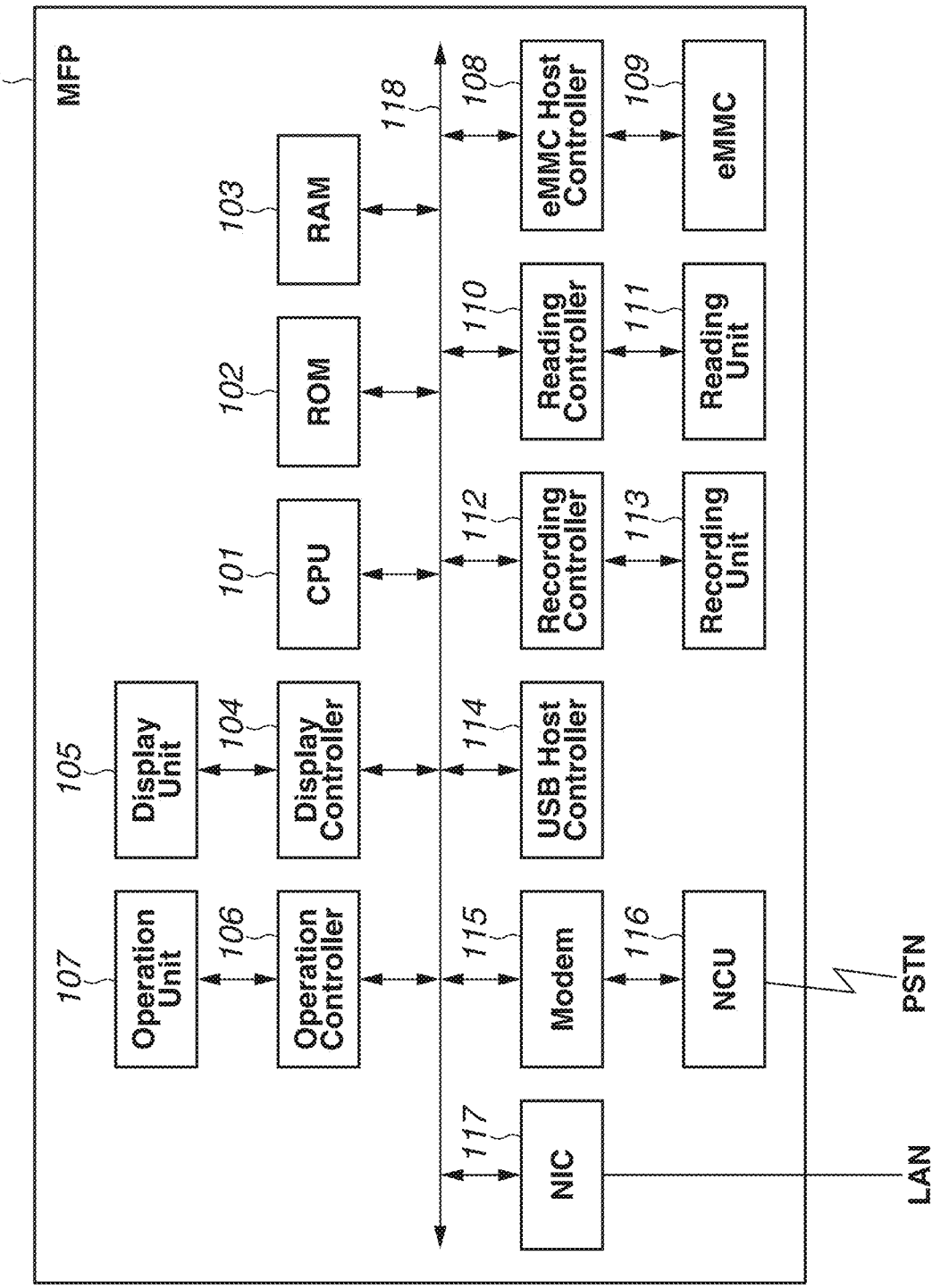
FIG. 1 is a block diagram illustrating an example of a hardware configuration of a multifunction peripheral (MFP).

FIG. 1 is a block diagram illustrating an example of a hardware configuration of a multifunction peripheral (MFP) 10. As illustrated in FIG. 1, the MFP 10, which is an image processing apparatus, includes a central processing unit (CPU) 101, a read-only memory (ROM) 102, a random-access memory (RAM) 103, a display controller 104, a display unit 105, an operation controller 106, and an operation unit 107. The MFP 10 also includes an embedded MultiMediaCard (eMMC) host controller 108, an eMMC 109, a reading controller 110, a reading unit 111, a recording controller 112, and a recording unit 113. The MFP 10 further includes a Universal Serial Bus (USB) host controller 114, a modulator-demodulator (MODEM) 115, a network control unit (NCU) 116, and a network interface card (NIC) 117.

The CPU 101 controls each of the devices connected to a system bus 118. If power is supplied to the MFP 10, the CPU 101 executes a boot program stored in the ROM 102. Normally, the boot program loads a main program stored in a particular area in the eMMC 109 into the RAM 103 and jumps to the beginning address of the loaded main program. The RAM 103 functions not only as the loading location for the main program, but also as a work area for the main program.

The display controller 104 controls drawing on the display unit 105. The display unit 105 is a full bitmap liquid crystal display (LCD) of a Wide Video Graphics Array (WVGA) size. The operation controller 106 controls input from the operation unit 107 included in the MFP 10. The operation unit 107 is composed of a touch panel disposed on top of the display unit 105.

The reading unit 111 reads a document. To the reading unit 111, an automatic document feeder (not illustrated) is attached as an option. The reading unit 111 can automatically read a plurality of documents. The reading unit 111 is connected to the reading controller 110. The CPU 101 communicates with the reading unit 111 via the reading controller 110. Some reading unit includes a sensor. Such a device has an automatic size detection function for automatically detecting the length of a document in its conveying direction and the length of the document in its width direction orthogonal to the conveying direction using the sensor. The reading unit 111 includes platen glass (a document platen), an optical system, and a size detection sensor (not illustrated). The reading unit 111 reads an image of the document while causing a pressure plate to fix a document placed on the document platen and moving the optical system.

The size detection sensor is provided below the platen glass (the document platen) in a vertical direction. A light-receiving unit of the size detection sensor receives infrared light emitted from a light-emitting unit (not illustrated). The size detection sensor detects the presence or absence of a document at a measurement position based on the amount of the received infrared light. At least based on the detection result, the CPU 101 identifies the size of the document placed on the document platen.

In the automatic size detection function, the size detection sensor detects the presence or absence of a document while the pressure plate provided in the reading unit 111 is closed and a document is fixed, and the CPU 101 identifies the size of the document. If the pressure plate is not closed and a document is not fixed, the size detection sensor does not detect the presence or absence of a document. Specifically, the amount of received infrared light cannot be accurately detected in a state where the pressure plate is not closed. Thus, the light-emitting unit is controlled not to emit light until the pressure plate is closed. Alternatively, the light-receiving unit may be controlled not to receive light until the pressure plate is closed. Thus, the CPU 101 does not identify the size of the document.

The CPU 101 may identify the size of a document using information from the size detection sensor and identify a reading size based on the size of the document. Alternatively, the CPU 101 may directly identify the reading size using the information from the size detection sensor.

In addition to the state where the pressure plate is not closed, there is also a case where the CPU 101 does not identify the size of a document. For example, in a case where a document placed on the document platen is of an irregular size or is of a smaller size than a predetermined size, the size detection sensor cannot detect the presence or absence of a document, and the CPU 101 cannot identify the size of the document.

The recording unit 113 prints an image on a sheet by an electrophotographic method. The recording unit 113 is connected to the recording controller 112, and the CPU 101 communicates with the recording unit 113 via the recording controller 112.

The USB host controller 114 controls the USB protocol and mediates access to a USB device, such as a USB memory (not illustrated).

The MODEM 115 modulates and demodulates a signal for facsimile communication. The MODEM 115 is connected to the NCU 116. The signal modulated by the MODEM 115 is transmitted to the public switched telephone network (PSTN) via the NCU 116.

The NIC 117 exchanges data of email or a file with a server in a two-way manner via a local area network (LAN). The NIC 117 also exchanges data with a web server in a two-way manner.

The MFP 10 according to the present exemplary embodiment includes the eMMC 109 as storage. The CPU 101 accesses the eMMC 109 via the eMMC host controller 108.

Figure 2:
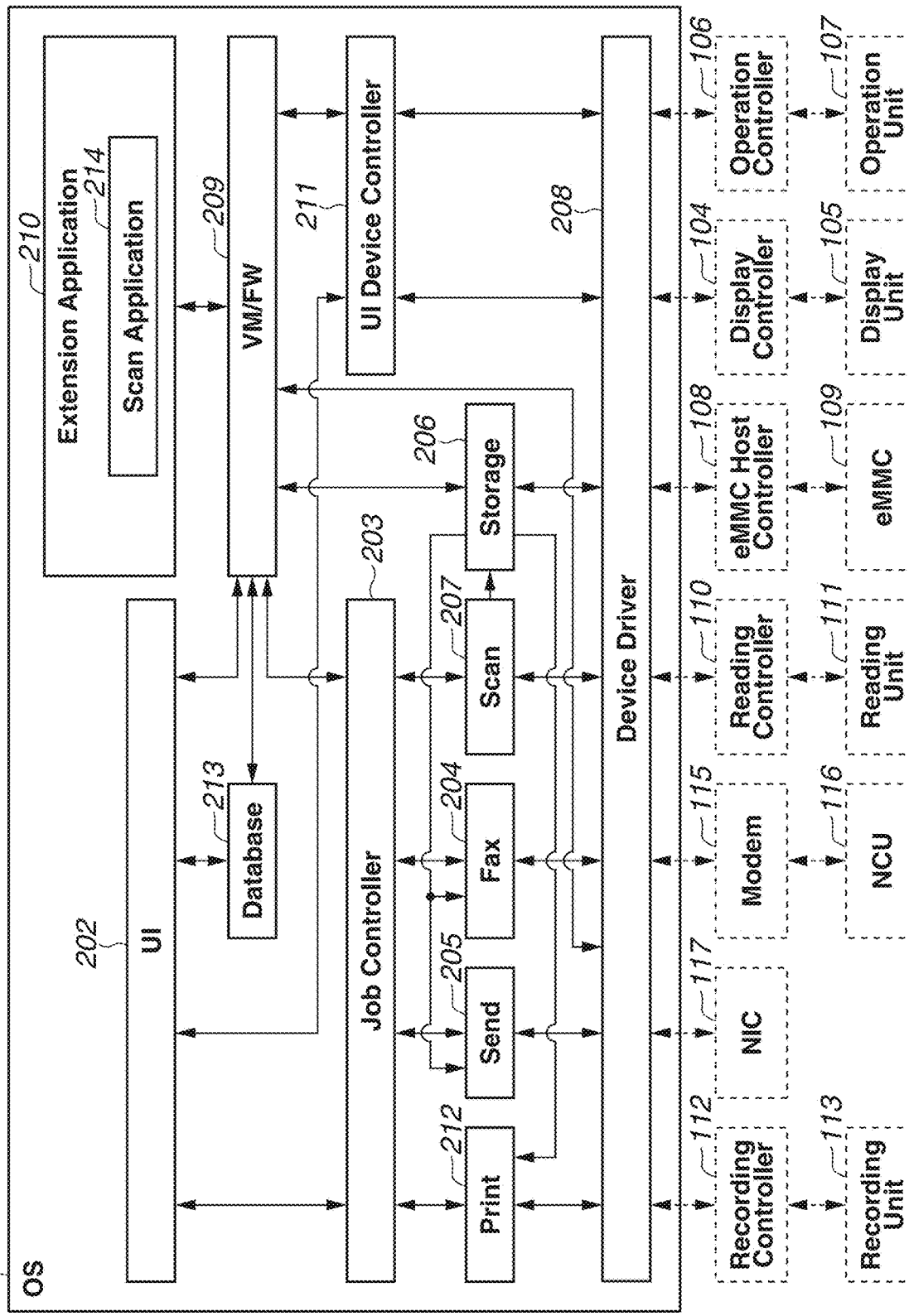
FIG. 2 is a block diagram illustrating an example of a software configuration of the MFP.

FIG. 2 is a block diagram illustrating an example of a software configuration of the MFP 10. In FIG. 2, components indicated by solid lines are software modules achieved by the CPU 101 causing the boot program to execute the main program loaded into the RAM 103.

In the main program, an operating system (OS) 201 manages and controls each of module executions described below. The OS 201 is combined with a device driver unit 208. The device driver unit 208 mediates communication with hardware devices, such as the display controller 104, the operation controller 106, and the reading controller 110.

A user interface (UI) unit 202 provides various types of information to a user and also receives various instructions from the user through the display unit 105 and the operation unit 107. Various settings for switching the operation of the MFP 10 can also be changed by the UI unit 202. The various settings changed by the UI unit 202 are stored in the eMMC 109 via a database unit 213. The various settings also include a setting of a display language to be changed by the UI unit 202.

A job controller unit 203 receives a copy job, a print job, or a fax job, and controls the execution of the received job.

A storage unit 206 is a software module configured to store in the eMMC 109 and manage, for example, an image to be transmitted and received by facsimile or data, such as an application setting requested by an extension application unit 210.

For example, in the MFP 10, if the job controller unit 203 receives a fax transmission job, a scan unit 207 receives a request for the job and controls the reading unit 111 to scan a document. The scan unit 207 then stores the scanned facsimile image data in the storage unit 206. The facsimile image data stored in the storage unit 206 is read by a fax unit 204 and transmitted by facsimile to a partner apparatus via the MODEM 115 and the NCU 116. Alternatively, image data received by facsimile from the partner apparatus via the MODEM 115 and the NCU 116 is imported by the fax unit 204 and stored in the storage unit 206.

The MFP 10 includes a virtual machine (VM)/framework (FW) unit 209. The extension application unit 210 is physically disposed on the eMMC 109. The extension application unit 210 stores a plurality of applications from any program written in a scripting language. The scripting language may be, for example, Java®, which is an interpreter to interpret and execute a byte code, and a language system such as Lua. The VM/FW unit 209 functions to install any program written in a scripting language or a predetermined high-level programming language on the extension application unit 210, or uninstall the program from the extension application unit 210. Simultaneously, the VM/FW unit 209 holds, on the storage unit 206, status information regarding the installed application including information about whether the installed application is enabled or disabled. The VM/FW unit 209 also has the ability to, if an archive obtained by compressing a plurality of preinstalled applications is present on the ROM 102, install the archive on the extension application unit 210 while decompressing the archive as needed. The details are omitted. The VM/FW unit 209 also mediates between a function achieved by any program installed on the extension application unit 210 and an existing function. The VM/FW unit 209 receives the selection of a button displayed on the display unit 105 and executes an application corresponding to the button by interpreting the content of the application while loading the scripting language of the application into the RAM 103. With these configurations, the MFP 10 according to the present exemplary embodiment can easily achieve any function such as a scan application 214 while maintaining attachability and detachability of a function. The VM/FW unit 209 further receives a request from any program installed on the extension application unit 210 and references or changes various setting values stored in the database unit 213.

A UI device controller 211 mediates output of various types of information from the UI unit 202 and the extension application unit 210 to the display unit 105, and transmission of a user operation performed on the operation unit 107 to the UI unit 202 and the extension application unit 210.

Figure 3:
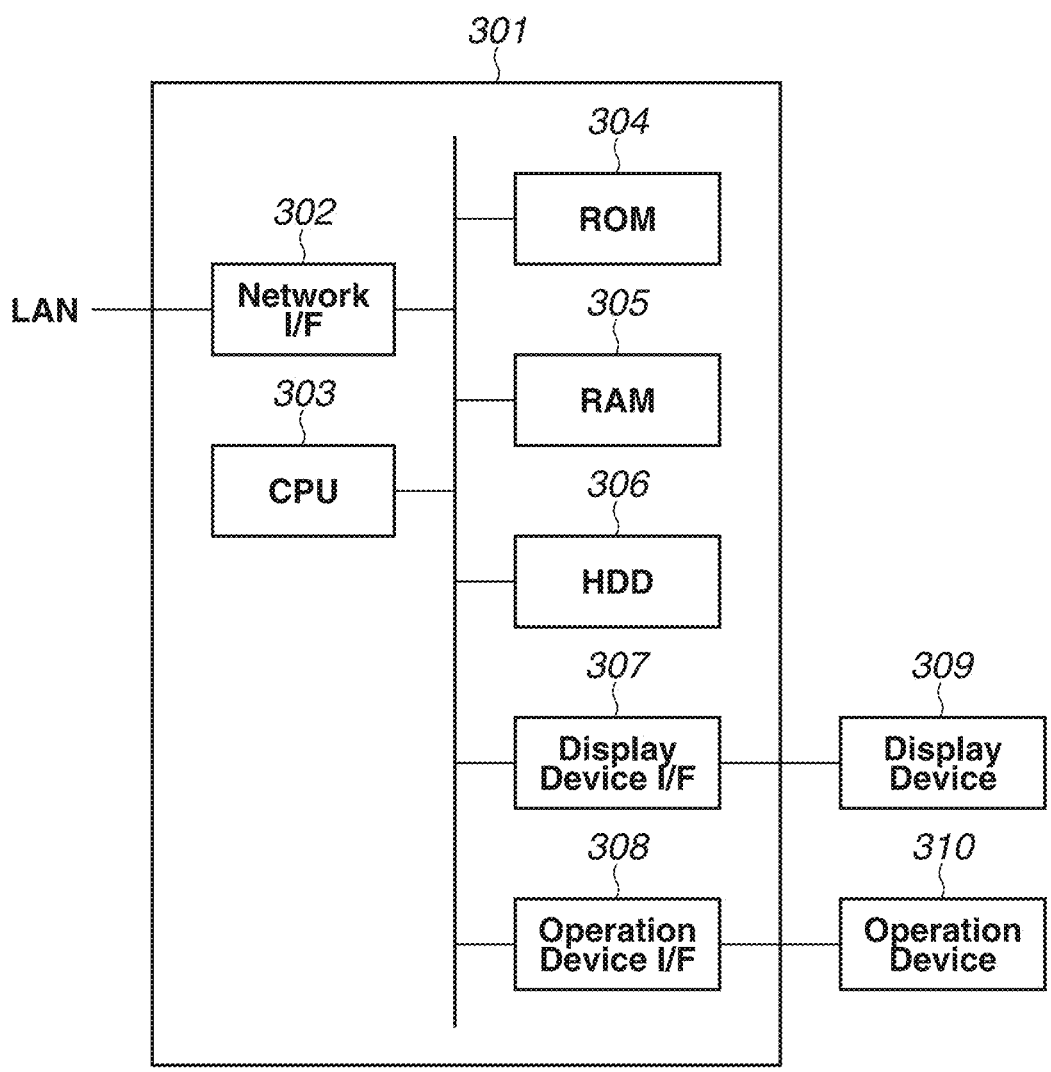
FIG. 3 is a block diagram illustrating an example of a hardware configuration of a personal computer (PC).

FIG. 3 is a block diagram illustrating an example of the hardware configuration of a personal computer (PC) 301. The PC 301, which is an information processing apparatus, includes a network interface (I/F) 302, a CPU 303, a ROM 304, a RAM 305, a hard disk drive (HDD) 306, a display device I/F 307, and an operation device I/F 308. The ROM 304 stores a control program. The RAM 305 is used as a work memory. The HDD 306 stores various types of data.

The display device I/F 307 is an interface for connecting to an external display device 309, such as a display. The operation device I/F 308 is an interface for connecting to an external operation device 310, such as a mouse, and a keyboard.

Figure 4:
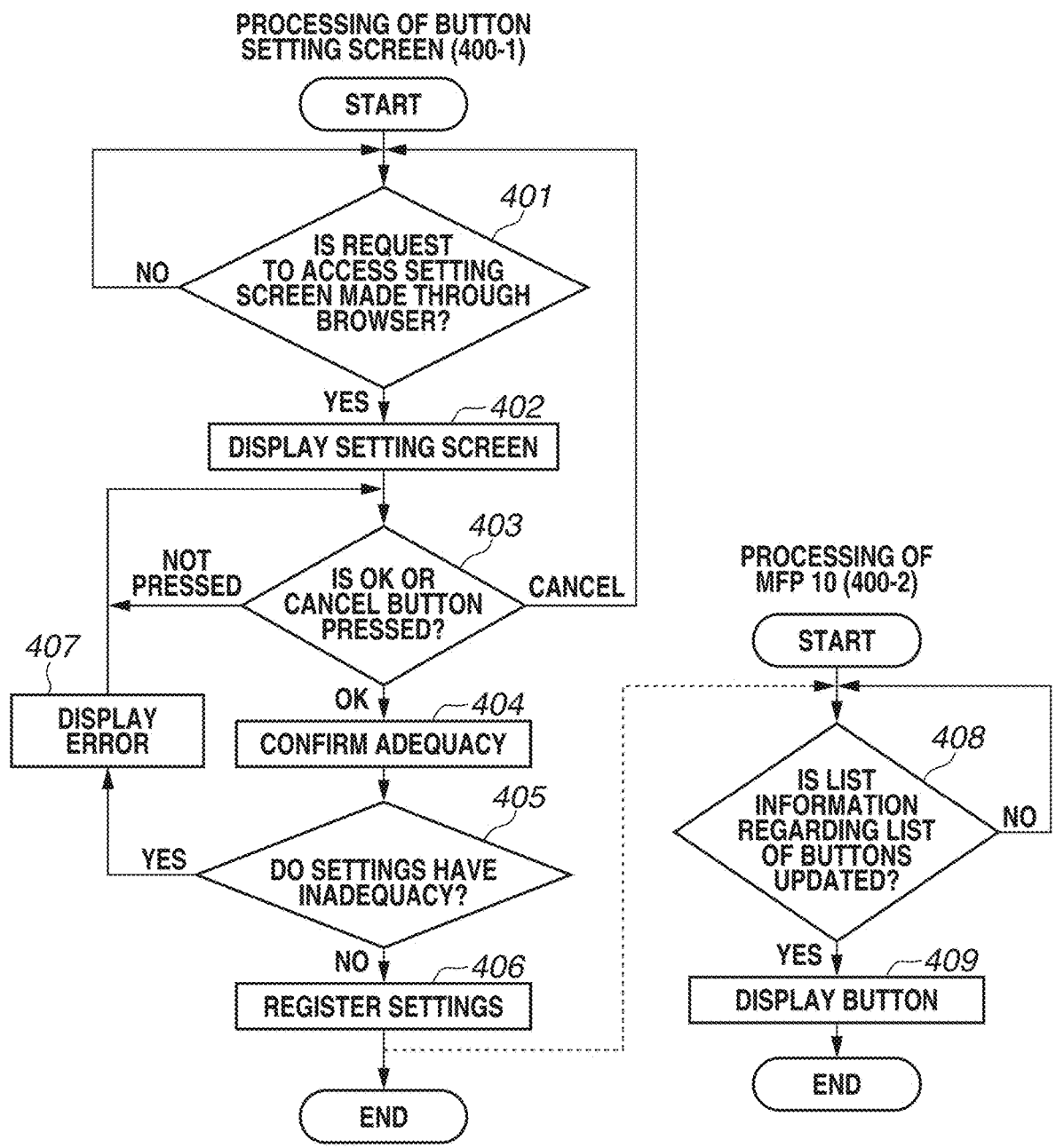
FIG. 4 is flowcharts illustrating an example of a process of setting a button on a display unit.

FIG. 4 is flowcharts illustrating an example of the process of setting a button on the display unit 105. An extension application is an application that, when an extension application start button displayed on the display unit 105 is pressed, starts scanning a document and transmits data obtained by scanning the document to a destination set in advance. Processing in a flowchart 400-1 in FIG. 4 is executed by the CPU 303 loading a program stored in the ROM 304 into the RAM 305 and executing the program. Processing in a flowchart 400-2 in FIG. 4 is executed by the CPU 101 loading a program stored in the ROM 102 into the RAM 103 and executing the program.

Figure 5:
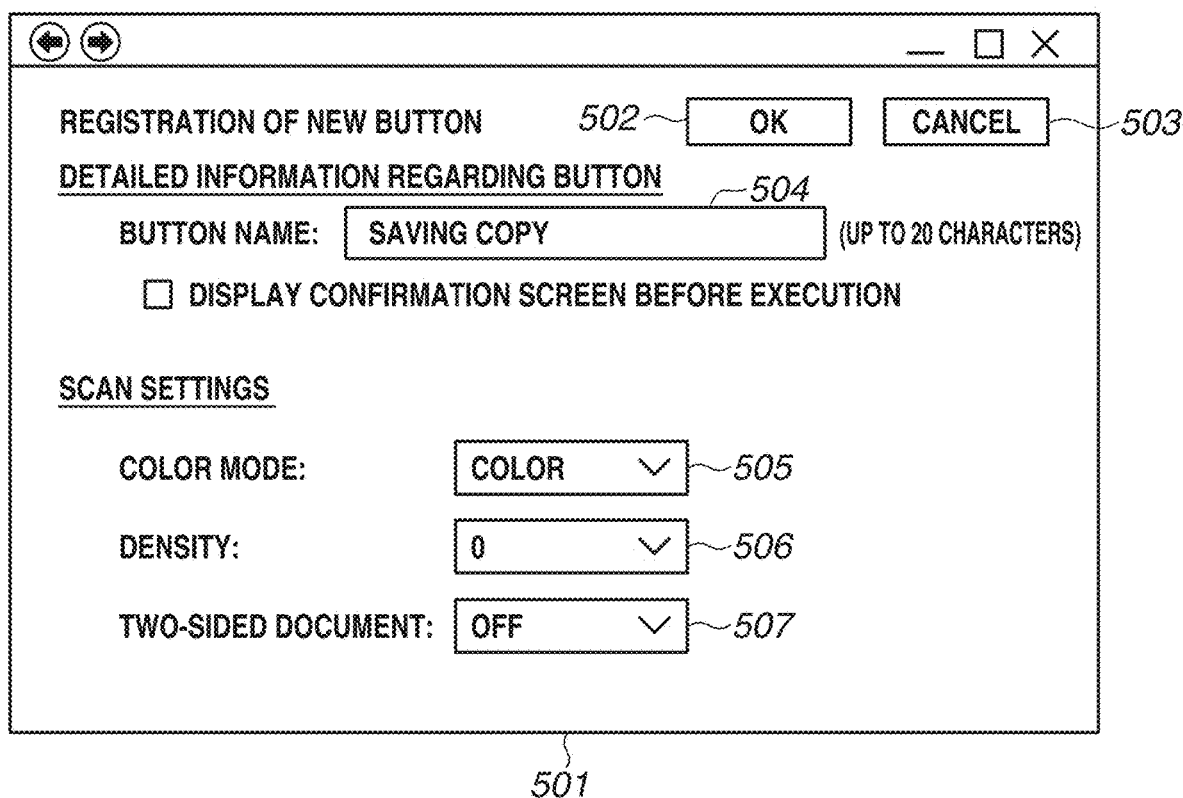
FIG. 5 is a diagram illustrating an example of a button setting screen.
Figure 6:
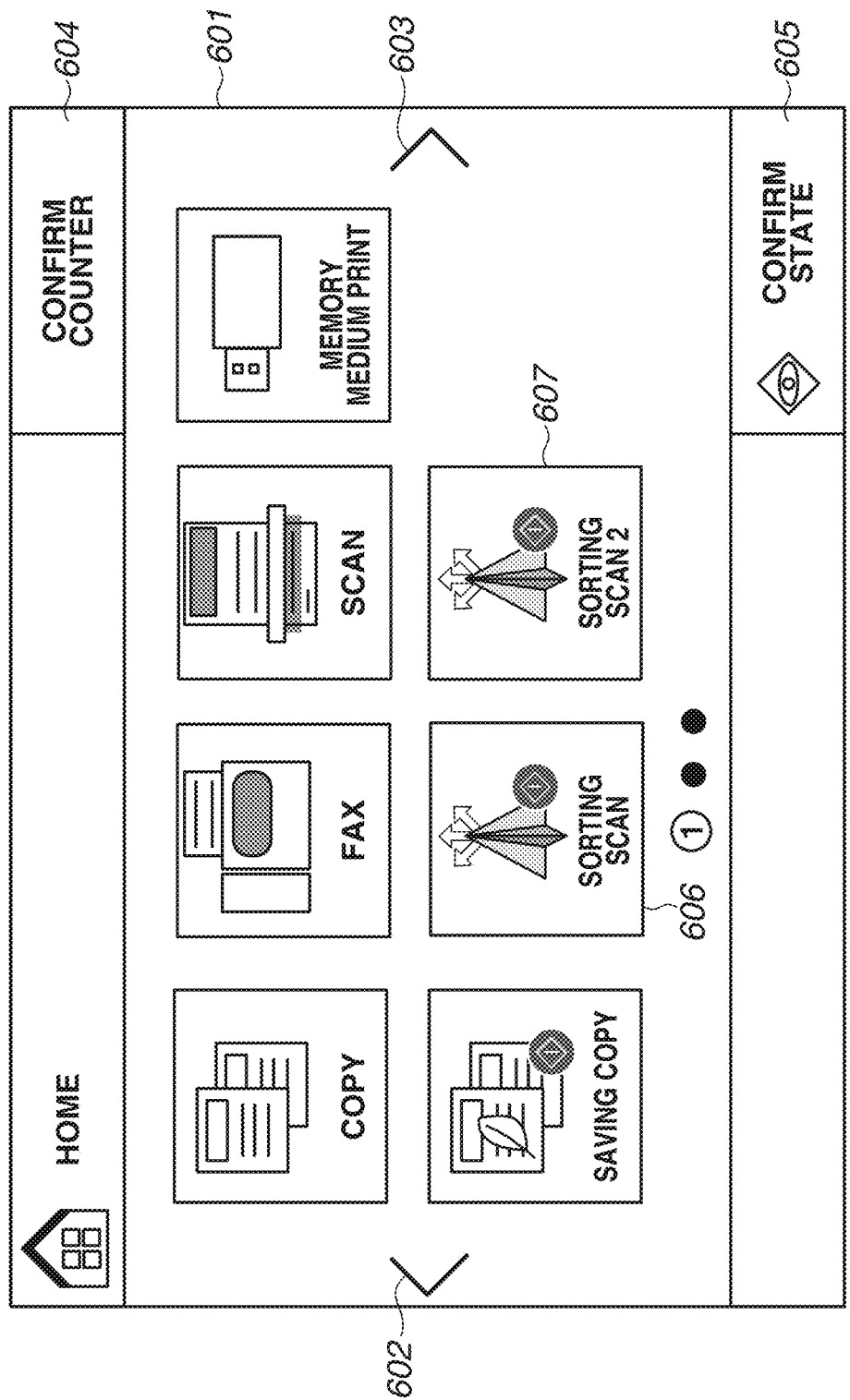
FIG. 6 is a diagram illustrating an example of a screen displayed on the display unit.

In FIG. 4, the flowchart 400-1 illustrates processing of the PC 301 connected to the MFP 10 via the LAN, and the flowchart 400-2 illustrates processing of the MFP 10. FIG. 5 is a diagram illustrating an example of a button setting screen 501. The setting screen 501 illustrates an example of a screen displayed on a web browser screen of the PC 301 connected to the MFP 10 via the LAN. FIG. 6 is a diagram illustrating an example of a screen displayed on the display unit 105.

In step S401, the CPU 303 of the PC 301 determines whether an access request to access the extension application start button setting screen 501 is made to the MFP 10 through the web browser. If it is determined that the access request is not made (NO in step S401), the processing returns to step S401, and the process of step S401 is repeated. If it is determined that the access request is made (YES in step S401), the CPU 301 receives information (a HyperText Markup Language (HTML) file) for displaying the extension application start button setting screen 501 from the MFP 10 via the network OF 302.

In step S402, the PC 303 displays on the display device 309 the setting screen 501 based on the HTML file received using the web browser. On the setting screen 501, various objects are displayed. An entry field 504 is an entry field where a name of a button to be displayed on the display unit 105 of the MFP 10 is to be registered. The user inputs a character string using the operation device 310. The button displayed on the display unit 105 of the MFP 10 is selected, whereby one of various jobs is executed by the MFP 10, and the button is registered in association with settings for executing the job (scan settings in the present exemplary embodiment).

A pull-down menu 505 is a pull-down menu for the user to select a color mode in the scan settings from "color", "grayscale", "monochrome", and "color/monochrome automatic distinction".

A pull-down menu 506 is used for the user to select a value of a density in the scan settings. A pull-down menu 507 is used for selecting whether a document to be scanned is a two-sided document.

An OK button 502 is used for finalizing the registration of the button with the input name and the selected settings. If the OK button 502 is selected, the selected settings are transmitted to the MFP 10. The MFP 10 then stores setting information regarding the selected settings in the eMMC 109.

A cancel button 503 is used for cancelling the input name and the selected settings. If the cancel button 503 is pressed, the selected settings are neither transmitted to the MFP 10 nor stored.

In step S403, the CPU 303 of the PC 301 determines whether the OK button 502 or the cancel button 503 is pressed on the setting screen 501. If neither the OK button 502 nor the cancel button 503 is pressed, the processing returns to step S403, and the process of step S403 is repeated. If it is determined that the cancel button 503 is pressed, the processing returns to step S401, and the process of step S401 is repeated. If it is determined that the OK button 502 is pressed, the processing proceeds to step S404.

In step S404, the CPU 303 confirms whether the content set on the setting screen 501 has an inadequacy. The inadequacy of the set content is, for example, a case where the OK button 502 is pressed in the state where the button name (entry field 504) illustrated in FIG. 5 is not set, or a case where the OK button 502 is pressed in the state where a character or a character type that is not allowed to be input is input.

In step S405, the CPU 303 determines whether the settings have an inadequacy as the result of the confirmation performed in step S404. If it is determined that the settings have an inadequacy (YES in step S405), the processing proceeds to step S407. In step S407, an error screen indicating that the settings have an inadequacy is displayed on the display device 309.

If it is determined in step S405 that the settings do not have an inadequacy (NO in step S405), the processing proceeds to step S406. In step S406, the CPU 303 transmits the setting information to the MFP 10 via the network OF 302. A registration process for registering the settings also includes the addition of button information to a button list to be displayed on the display unit 105. The present exemplary embodiment assumes that the confirmation of the settings in step S404 is made based on a scripting language, such as JavaScript®, included in a content displayed on the web browser. The present disclosure is not limited to this. The web browser may transmit the setting content to the MFP 10, and the MFP 10 may confirm the setting content and return the confirmation result to the web browser.

In step S408, the CPU 101 of the MFP 10 determines whether list information regarding the button list to be displayed on the display unit 105 is updated. That is, the CPU 101 receives from the PC 301 the setting information including a registration request to register the button, and determines whether the setting information is stored in the list. If it is determined that the list information regarding the button list is not updated (NO in step S408), the processing returns to step S408, and the process of step S408 is repeated. If it is determined that the list information is updated (YES in step S408), the processing proceeds to step S409. In step S409, the CPU 101 displays the button on the display unit 105, and the processing of the MFP 10 ends. An example of the button displayed on the display unit 105 at this time is described with reference to a home screen 601 illustrated in FIG. 6.

FIG. 6 is a diagram illustrating an example of a home screen 601 displayed on the display unit 105 of the MFP 10. The home screen 601 displays buttons for executing various functions of the MFP 10, the functions including a copy function, a fax function, and a scan function.

A movement button 602 is used for displaying a screen to the left of the home screen 601. A movement button 603 is used for displaying a screen to the right of the home screen 601.

A counter button 604 is used for displaying a counter on the display unit 105 by being selected. A "confirm state" button 605 is used for displaying the state of a currently executed job or an already executed job on the display unit 105 by being selected.

A scan button 606 is registered if an OK button 703 is selected on a setting screen 701 illustrated in FIG. 7. Scanning is executed based on settings selected on the setting screen 701. According to the selection of the scan button 606, the MFP 10 can automatically execute scanning without the operation unit 107 receiving the scan settings again.

A scan button 607 is a button in association with which different settings from the settings stored in association with the scan button 606 are stored. Similarly to the scan button 606, if the scan button 607 is selected, scanning is executed based on setting information regarding the settings stored in association with the scan button 607.

In an MFP in which reading settings are registered in association with a button as described above, if the MFP fails to detect the size of a document after receiving the selection of the button by a user as discussed in Japanese Patent Application Laid-Open No. 2012-222764, and then displays a screen for receiving the selection of a reading size from the user, the following issue arises.

The advance registration of the reading settings in association with the button enables the execution of a reading process by a single user operation. However, if the MFP fails to detect the size of the document, the user selects the reading size, and thus convenience is impaired.

The following processing is executed in response to the above issue, whereby it is possible to, in an image processing apparatus in which reading settings are registered in advance in association with a button, minimize operations of a user regarding the execution of a reading process.

Figure 8:
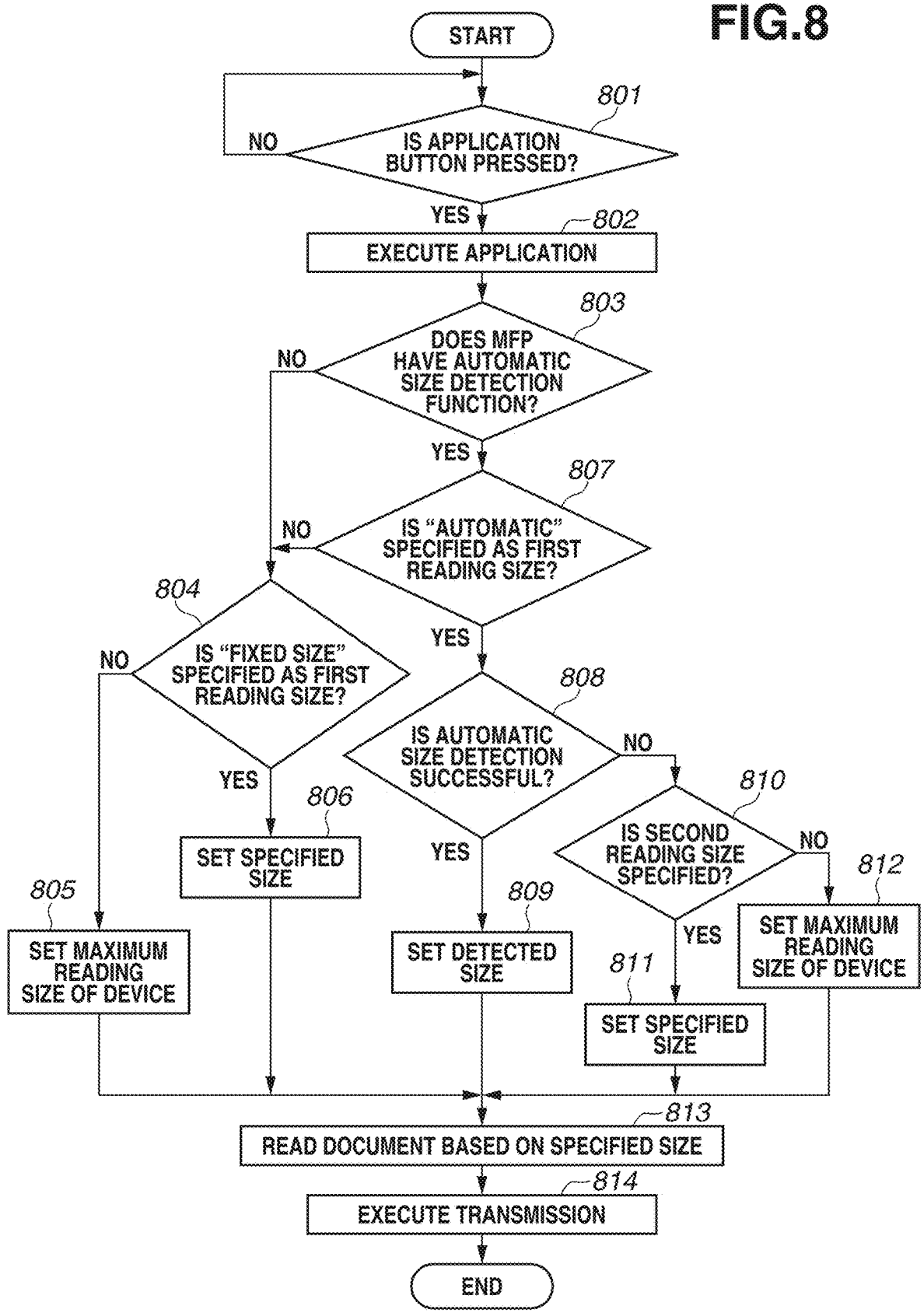
FIG. 8 is a flowchart illustrating an example of processing when a scan button is selected.

FIG. 8 is a flowchart illustrating an example of processing when a scan button is selected. The processing of the flowchart in FIG. 8 is executed by the CPU 101 loading a program stored in the ROM 102 into the RAM 103 and executing the program.

In step S801, the CPU 101 determines whether the scan button 606 displayed on the display unit 105 is selected through the operation unit 107. If it is determined that the scan button 606 is not selected (NO in step S801), the processing returns to step S801, and the process of step S801 is repeated. If it is determined that the scan button 606 is selected (YES in step S801), the processing proceeds to step S802. The scan button 606 is a button registered on the setting screen 701 illustrated in FIG. 7.

FIG. 7 is a diagram illustrating an example of the setting screen 701. On the setting screen 701 in FIG. 7, settings can be made using a pull-down menu 705 and a pull-down menu 706 in addition to the pull-down menus on the setting screen 501 in FIG. 5.

The pull-down menu 705 is used for the user to select a size based on which the reading unit 111 is to read an image of a document. Options of the size include "automatic" for which the automatic size detection function is used, A4, B4, A5, B5, and A3. On the setting screen 701, "automatic" is selected.

The pull-down menu 706 is used for selecting a reading size to be used, in a case where "automatic" is selected with the pull-down menu 705, and if the CPU 101 cannot identify the reading size because the pressure plate is not closed. Options of the reading size include A4, B4, A5, B5, and A3, but do not include "automatic".

If a fixed reading size, such as A4, and B4, other than "automatic" is selected using the pull-down menu 705, the pull-down menu 706 is grayed out as illustrated in a setting screen 702 so that a reading size cannot be selected. Alternatively, the pull-down menu 706 may not be grayed out, and the pull-down menu 706 itself may not be displayed.

In step S802, the CPU 101 executes a job based on the settings on the setting screen 701 that are associated with the scan button 606.

In FIG. 8, a "first reading size" and a "second reading size" refer to setting values set using the pull-down menu 705 and the pull-down menu 706, respectively, on the setting screen 701 illustrated in FIG. 7.

In step S803, the CPU 101 determines whether the MFP 10 has the automatic size detection function. If it is determined that the MFP 10 does not have the automatic size detection function (NO in step S803), the processing proceeds to step S804. If it is determined that the MFP 10 has the automatic size detection function (YES in step S803), the processing proceeds to step S807.

In step S804, the CPU 101 determines whether a fixed size, such as A4 or B4, is selected using the pull-down menu 705. If it is determined that the fixed size is selected (YES in step S804), the processing proceeds to step S806. If not, i.e., if "automatic" is selected (NO in step S804), the processing proceeds to step S805.

In step S805, the CPU 101 sets as a reading size the maximum reading size that can be set in the MFP 10. In step S806, the CPU 101 sets as a reading size the size selected using the pull-down menu 705.

In step S807, the CPU 101 determines whether "automatic" is selected using the pull-down menu 705. If it is determined that "automatic" is selected (YES in step S807), the processing proceeds to step S808. If not (NO in step S807), the processing proceeds to step S804.

In step S808, the CPU 101 determines whether the CPU 101 succeeds in identifying a reading size by executing the automatic size detection function. If it is determined that the CPU 101 succeeds in identifying the reading size (YES in step S808), the processing proceeds to step S809. If it is determined that the CPU 101 fails to identify the reading size (NO in step S808), the processing proceeds to step S810.

In step S809, the CPU 101 sets as a reading size the reading size identified by executing the automatic size detection function.

In step S810, the CPU 101 determines whether a reading size is specified using the pull-down menu 706. If it is determined that the reading size is specified (YES in step S810), the processing proceeds to step S811. If not (NO in step S810), the processing proceeds to step S812.

In step S811, the CPU 101 sets as a reading size the size specified using the pull-down menu 706. In step S812, the CPU 101 sets as a reading size the maximum reading size that can be set in the MFP 10.

In step S813, the CPU 101 controls the reading unit 111 to read an image of a document based on the set reading size and other scan settings, thereby generating image data.

In step S814, the CPU 101 transmits the image data generated in step S813 to a destination indicated by destination information. The destination information is set in advance as a destination setting (not illustrated) on the setting screen 701 and stored in association with the scan button 606.

In steps S805 and S812, the maximum reading size that can be set in the MFP 10 is set as the reading size of the document. Alternatively, a size defined in advance may be set as the reading size of the document based on the default settings of the device. Alternatively, a message screen for a reading error may be displayed on the display unit 105.

In the description of the MFP 10 according to the present exemplary embodiment, the display unit 105 and the operation unit 107 are different components. Alternatively, a display unit and an operation unit may be placed on top of each other as formed in a touch panel.

In the present exemplary embodiment, an example has been described where a button is registered through the web browser of the PC 301. Alternatively, a button may be registered by receiving settings through the operation unit 107 of the MFP 10.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU) or the like) and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-166875, filed Sep. 13, 2019, which is hereby incorporated by reference herein in its entirety.

What is claimed is:

1. An image processing apparatus that can execute a scan job, the image processing apparatus comprising:
   one or more sensors;
   a communicator;
   a scanner configured to, by execution of the scan job, scan a document and then generate image data; and
   a controller including a processor and a memory, the controller configured to:
      execute a specifying process for specifying a scan size based on detection result of the one or more sensors;
      register, before the specifying process is executed, a substitute scan size that is input by a user and that is to be used on the basis that the controller does not specify a scan size in the executed specifying process; and
      set a predetermined setting of the scan job, the predetermined setting being a setting for executing, using a scan size specified in the specifying process, the scan job,
   wherein, on the basis that the controller does not specify a scan size in the executed specifying process, the scan job of which the predetermined setting is set is executed using the substitute scan size registered, before the specifying process is executed, by the controller, and
   wherein the communicator transmits the image data generated by the execution of the scan job using the substitute scan size to a destination.

2. The image processing apparatus according to claim 1, further comprising a display configured to display an object,
   wherein the controller is configured to register the input scan size in association with the object to be displayed on the display, and
   wherein the controller is configured to execute the scan job based on selection of the object by the user.

3. The image processing apparatus according to claim 1, wherein in a case where the controller set the predetermined setting and the controller does not register the substitute scan size and the controller does not specify a scan size in the executed specifying process, the controller executes the scan job using a predetermined scan size.

4. The image processing apparatus according to claim 3, wherein the predetermined scan size is the maximum scan size that can be set in the image processing apparatus.

5. The image processing apparatus according to claim 1, wherein the controller cannot set the substitute scan size in a case where the controller does not set the predetermined setting.

6. The image processing apparatus according to claim 1, wherein the controller is configured to further register a color mode, a density, and a two-sided setting.

7. The image processing apparatus according to claim 2, wherein the communicator transmits the generated image data to the destination indicated by destination information registered in association with the object.

8. The image processing apparatus according to claim 1, further comprising a printer configured to print an image on a sheet based on the generated image data.

9. A method for controlling an image processing apparatus executing a scan job and including one or more sensors and a scanner that, by execution of the scan job, scans a document and then generates image data, the method comprising:
- executing a specifying process for specifying a scan size based on detection result of the one or more sensors;
- registering, before the specifying process is executed, a substitute scan size that is input by a user and that is to be used on the basis that a scan size is not specified in the executed specifying process;
- setting a predetermined setting of the scan job, the predetermined setting being a setting for executing, using a scan size specified in the specifying process, the scan job,
- wherein, on the basis that a scan size is not specified in the executed specifying process, the scan job of which the predetermined setting is set is executed using the substitute scan size registered before the specifying process is executed; and
- transmitting the image data generated by the execution of the scan job using the substitute scan size to a destination.

10. A non-transitory computer-readable storage medium storing a program that, when executed by a computer, causes the computer to execute a method of controlling an image processing apparatus executing a scan job and including one or more sensors and a scanner that, by execution of the scan job, scans a document and then generates image data, the method comprising:
- executing a specifying process for specifying a scan size based on detection result of the one or more sensors;
- registering, before the specifying process is executed, a substitute scan size that is input by a user and that is to be used on the basis that a scan size is not specified in the executed specifying process;
- setting a predetermined setting of the scan job, the predetermined setting being a setting for executing, using a scan size specified in the specifying process, the scan job,
- wherein, on the basis that a scan size is not specified in the executed specifying process, the scan job of which the predetermined setting is set is executed using the substitute scan size registered before the specifying process is executed; and
- transmitting the image data generated by the execution of the scan job using the substitute scan size to a destination.

* * * * *